United States Patent [19]

Sumner

[11] 4,335,752
[45] Jun. 22, 1982

[54] FLANGED PIPE

[75] Inventor: Maurice N. Sumner, Houston, Tex.

[73] Assignee: The Sea Horse Corporation, Houston, Tex.

[21] Appl. No.: 840,319

[22] Filed: Oct. 7, 1977

Related U.S. Application Data

[63] Continuation of Ser. No. 636,311, Nov. 28, 1975, abandoned.

[51] Int. Cl.³ .............................................. F16L 55/18
[52] U.S. Cl. ..................................... 138/97; 405/154; 405/156; 138/155; 138/178
[58] Field of Search ................. 138/155, 97, 104, 105, 138/106, 143, 178; 285/4, 15, 17, 31, 32, 405; 61/72.1, 72.3, 72.4, 106; 116/114 A, DIG. 14; 405/154, 156

[56] References Cited

U.S. PATENT DOCUMENTS

| | | | |
|---|---|---|---|
| 438,068 | 10/1890 | Dunnett | 138/97 X |
| 699,648 | 5/1902 | Beigel | 138/155 |
| 780,789 | 1/1905 | Gardner | 138/175 X |
| 796,781 | 8/1905 | Welsh | 285/31 X |
| 818,272 | 4/1906 | Moats | 138/175 X |
| 1,009,840 | 11/1911 | Hickson | 138/175 |
| 1,185,846 | 6/1916 | Simpson | 285/4 X |
| 1,302,553 | 5/1919 | Hickson | 138/175 X |
| 1,310,597 | 7/1919 | Blaw | 138/175 X |
| 1,684,572 | 9/1928 | Boosey | 285/4 |
| 1,783,605 | 12/1930 | Della | 285/4 |
| 1,979,424 | 11/1934 | Trainer et al. | 138/105 X |
| 2,042,132 | 5/1936 | Treskow | 138/175 X |
| 2,340,965 | 2/1944 | Kiesel | 285/4 X |
| 2,449,754 | 9/1948 | Seitz | 285/4 |
| 2,660,199 | 11/1953 | Montgomery | 138/109 X |
| 2,708,896 | 5/1955 | Smith et al. | 116/DIG. 14 |
| 2,756,076 | 7/1956 | Rodriguez | 285/4 |
| 2,982,311 | 5/1961 | Haskell | 138/109 X |
| 3,232,637 | 2/1966 | Pennington et al. | 138/175 X |
| 3,324,894 | 6/1967 | Deal | 138/109 |
| 3,603,617 | 9/1971 | Lochridge | 61/72.3 |
| 3,645,834 | 2/1972 | McCoffrey | 138/174 X |
| 3,658,366 | 4/1972 | Welsh et al. | 61/72.3 X |
| 3,727,954 | 4/1973 | Oliver | 61/72.3 X |
| 3,848,421 | 11/1974 | O'Brien et al. | 61/72.3 |

FOREIGN PATENT DOCUMENTS 1383527 2/1975 United Kingdom ................. 61/72.3

Primary Examiner—James E. Bryant, III
Attorney, Agent, or Firm—Kenneth H. Johnson

[57] ABSTRACT

The method of providing submarine pipeline adapted for connecting and repairing, providing flanges therealong at intervals and means to repair an interval length of pipeline by connecting repair pieces to part of said flanges, including preferred steps of submarine removal of a damaged interval length with surface preparation and subsequent submarine installation of a replacement interval length.

1 Claim, 13 Drawing Figures

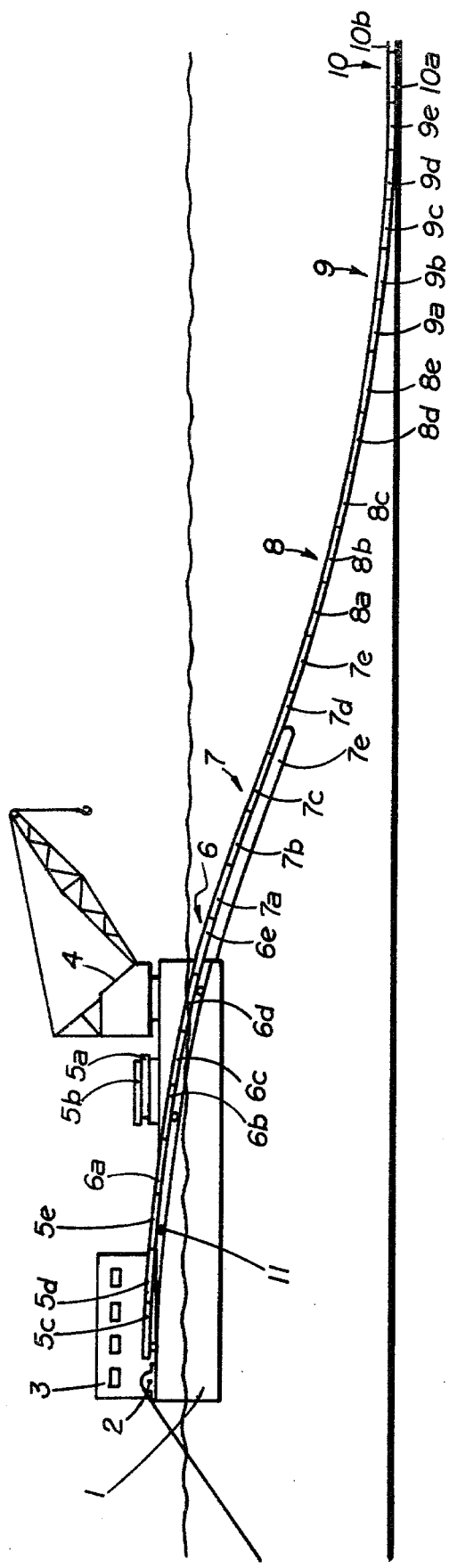
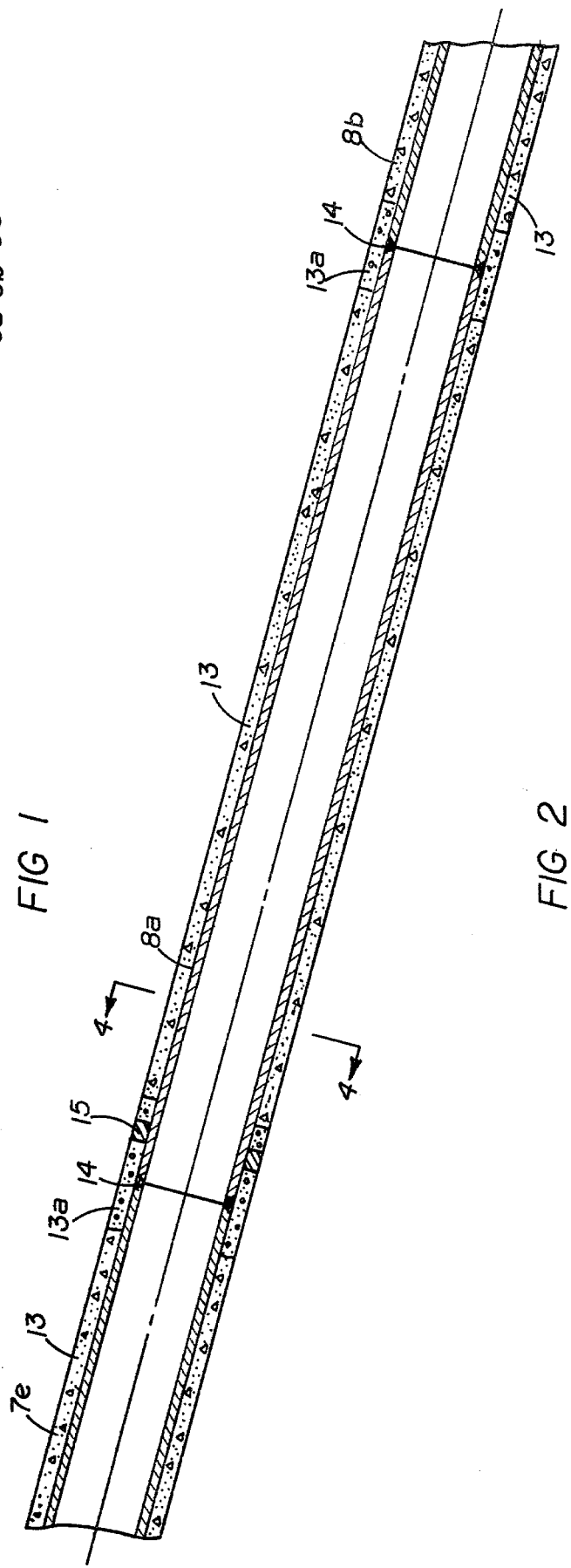
FIG 1
FIG 2

FLANGED PIPE

This is a continuation of application Ser. No. 636,311 filed Nov. 28, 1975 now abandoned.

BACKGROUND OF THE INVENTION

Offshore construction for petroleum production is in a growing boom; much of the work includes laying submarine pipelines. Thousands of miles of submarine pipelines have been laid in the past few years, presenting many problems which remain to be solved. One of the most serious is repair. Pipelines deteriorate and they are damaged, as by fishing trawls, ship anchors, scouring away of support, transport by currents, and by submarine landslides. The direct cost of repair is high. It is very often done by use of vessels and associated equipment costing more than $100,000 rental per day, with the total effort often requiring weeks, resulting in multimillion dollar direct costs. The indirect costs in lost product, lost time, and damage to environment are usually much greater.

There follows a brief description and analysis of six prior art methods now in use to repair submarine pipelines:

1. Picking up the line: When the sea is fairly calm and not too deep, and in the case of puncture or leaking of a pipeline, a derrick barge will go the site and by use of several hoisting means at once, lift the damaged part of the pipeline clear of the water, with the remainder draped away from the barge. The damaged part is then patched by wellknown means, such as welding, and the repaired line is then lowered back to the marine floor.

The deeper the water the greater the likelihood of inducing other damage, as by pulling the line in two or by buckling it, also, in case of buried pipelines, considerable excavation may be required. The above method is most suitable for calm seas, and unburied small lines in shallow water.

2. The "Hard Flange": An old and common method, in the case of somewhat deeper water, and perhaps in the case of complete rupture as by landslide, is to pick up, by derrick barge, two loose ends of the pipeline, perhaps after cutting away of the damaged part, just as the damaged section is picked up in the first method above. The ends are then fitted by welding with flanges, perhaps conventional flanges having bolt holes therearound, or perhaps flanges such as are made by Cameron Iron Works in Houston, Tex. which allow quick connection.

With the flanged end prepared, the line end is laid back on the marine floor. When two ends are so laid, a diver will go down to the bottom, gauge the gap between the ends, and send the results to workmen on the surface who will prepare a segment of pipe with two flanged ends (a "spool piece") to suit the guaging. The spool piece is then lowered to the diver, who must fit it between the two pipeline ends, bolt it or otherwise connect it thereto.

The "Hard Flange" method is a good method where it can be applied. It has the notable advantages of providing a simple strong reliable connection with metal-to-metal seal. Certain difficulties restrict its uses: (a) in case of deep or rough water, there is danger of buckling or otherwise damaging or overstressing the pipe in lifting it to the surface; (b) in case of buried pipelines, considerable excavation is required; or (c) in case of large pipelines, a large derrick barge may be required to lift so much pipe, and large derrick barges are costly, slow and not always available.

3. Adjustable mechanical connectors: HydroTech Systems makes a family of couplings, including one called the "Hydrocouple" which slips over the end of a pipeline and will mechanically connect to and seal onto the line. It allows axial adjustment and angular misalignment of the pipe ends. It will connect underwater to a bare pipe. This makes it very useful for repairs, and, to some extent in some cases overcomes the difficulties (a), (b) and (c) above. The Hydrocouple makes repairs possible without lifting or moving a great length of line. However, it introduces problems of its own: high cost (several hundred thousand dollars per set for large sizes), long delivery, potential leaks, and problems of handling underwater (it is heavy and requires precise positioning movement).

Other manufacturers are preparing to enter this market, but for the present purposes of disclosure they are comparable in value, and in problems introduced, to the Hydrocouple.

4. Welding in a Habitat: About the same time the Hydrocouple was being developed, several companies were developing underwater welding apparatus, including an assembly of huge alignment and handling frames for picking up and aligning the pipeline to be repaired, and a chamber fitted into the alignment frames. The chamber and the pipe are brought into alignment, with the pipeline passing through the chamber. The chamber is sealed and purged of water by air under pressure, providing a pressurized air environment for workmen in the chamber to gain access to the pipes for patching by welding.

These habitat frames work, but they are enormously large, heavy, expensive, and complicated, and repairs made therewith are consequently slow to mobilize and expensive to use, frequently costing several million dollars per repair. The repairs made may be poor, due to bad working conditions for welding and due to the difficulty of hyperbaric welding.

5. One atmosphere welding chambers: Lockheed Petroleum Services has devised one atmosphere chambers for installing connections on pipeline ends, overcoming certain difficulties of the previous method, but with the disadvantage of requiring the abandonment of the chamber whenever it is used. It is a costly method, adapted only to great depths.

6. Wet welding: Several companies have used a method of welding under water. The welds are not as strong as is desired, but will serve in some cases. An underwater weld is tested by using the pipeline. Thus if the weld is weak and ruptures, the repair must be made again.

At the present time all repair work on submerged pipelines is carried out on a cost plus basis, thus the ultimate loser is the consuming public.

In the preceding description of the prior art methods of repair of submerged pipelines, no deprecation is made or intended. Each of these methods has served and will continue to serve the essential task of pipeline repair. Great engineering feats have been performed to maintain the flow of oil and gas by devising techniques and equipment for use in at most hostile and difficult environments.

For better understanding, and to establish vocabulary, a brief review of prior art pipelaying practice follows, applied to a 36 inch diameter pipeline, 5 miles long, laid in water about 250 feet deep, for example: A "pipe lay barge" being a non-self propelled vessel a few hundred feet long having a "stinger" (a long curved adjustable guide truss means cantilevered off of the stern) is loaded with several hundred "joints" (40 foot lengths) of "weight-coated" (covered with about four inches of wire-mesh reinforced concrete all around the middle 38 feet of the joint) pipe.

The barge is then towed to the site of beginning, being a point at the shallow end of the line. A flange is welded onto a joint of pipe, and another joint welded to its other end, and other joints onto it in succession with the resultant beginning of a pipeline being fed or paid out the rear of the barge supported by the stinger. A long line is attached to the end of the pipe and it is hauled off the back of the barge over the stinger (by a tug or winch mounted on a platform) while the barge hauls itself the other way on its anchor cables or by other means such as a tugboat. Tension is maintained by the anchor cables to keep the line from bending over the end of the stinger under its own weight. When the process has continued long enough some length of pipeline will rest on the sea bead and new joints will be welded on and, the pipeline paid out until the intended destination is reached or until some interruption, such as a storm, in either case, the end of the line is dropped to the marine floor, preferably with a flange attached.

Problems of interest here include the problem of maintaining correct tension in the line along with a proper inclination of the stinger so that the line will not be damaged by bending (too little tension) or by pulling (too much tension). If damage should occur, repairs will be required, even on the new line, or a new line must be laid. Also, the problem resulting from having to drop the line, in case of trouble, before a flange can be attached, can be serious. The water may be too deep to pick up the pipe to continue laying, and the end is not prepared for connection.

The aforementioned methods are all well known in the art, and it is with a view to current problems that the present invention is advanced. The present invention offers advantage in cost, reliability, speed, safety, and protection of the environment, requiring only minimal cost and foresight to implement.

It is a particular advantage of the present invention that a means of making reliable metal-to-metal seals underwater is provided.

It is another advantage of the present invention that a method of predetermining the amount of pipe to be required in repairing a pipeline is provided.

It is a particular feature of the present invention that a minimum amount of handling of the pipe during repair is required.

It is another feature of the present invention that pipelines incorporating the invention may be laid using substantially the same equipment, such as barges, tugs, stingers, and the like used in the prior art.

DRAWINGS

FIG. 1 shows a method of laying a submerged pipeline.

FIG. 2 shows a laid pipeline joint.

SUMMARY OF THE INVENTION

Figure 4:
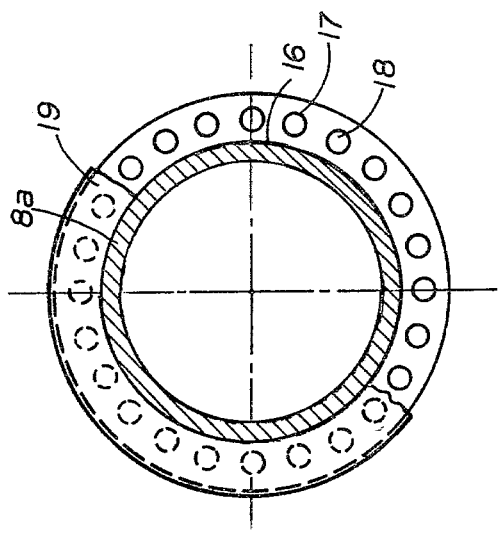
FIG. 4 is a cross sectional view of a flange according to the present invention taken on 4—4 of FIG. 3.

Briefly stated the present invention is a submarine pipeline having a plurality of bosses or protrusions therealong, said bosses being adapted for coupling the pipeline at that point to a similar pipe and the methods employing said pipeline. The coupling bosses will generally be in array along the pipeline and each boss preferably will be circumferential about said pipeline.

A unique feature of the present invention is the placement of said bosses at intervals along the pipeline but not necessarily a terminus thereof (a boss could be placed at the terminus). The placement is a recognition of the very real likelihood that some repair or modification will be required on the pipeline during its lifetime. The bosses are an extra expense of installation which will not necessarily have immediate use, but the method of repair as described hereinafter is such an advance over the art and provides such a definative means of repair, that the initial cost will not be a detriment.

The term "bosses" is used very broadly here to include any protrusion, including, but not necessarily limited to threads, studs, flanges and the like. It is generally contemplated that the bosses will be located on the outside of the pipeline, although, threads for example could be placed inside the pipe without serious disruption of flow in the pipeline.

The purpose of the bosses, which are located at selected or predetermined intervals along the pipeline, is to provide the means for making a rapid, relatively inexpensive, secure underwater connection in the pipeline. Most likely a new connection will be required because of repair to the line. Since damage is unexpected, it can be most expensive if repair is not made quickly. According to the present invention, the damaged section is removed between the nearest two bosses and a new section inserted into the pipeline, using the bosses to couple the new section into place. The placement, i.e., spacing of the bosses is an engineering determination based on the statistical likelihood that the pipeline will be damaged. Furthermore the spacing, and type of bosses placed along a pipeline can vary. For example, if it is statistically determined that there is little chance of damage or a break in a 20 mile pipeline over portion thereof then the bosses could be one or two miles apart in those portions. In a heavily fished area the bosses on the pipeline could be every 200 feet.

Although it is contemplated that whatever type of boss is employed will be continuous about the circumference of the pipe in most utilizations, the invention in its broadest aspect also contemplates non-continuous bosses, for example studs could be used to attach a collar or flange to pipeline at the cut away section.

It is also contemplated that the bosses will be conveniently located at welds in the pipeline sections, however, the location of the bosses at other points in the pipeline is also contemplated.

DETAILED DESCRIPTION OF THE INVENTION AND PREFERRED EMBODIMENTS

The present invention contemplates laying pipeline according to the methods outlined, but with integral provision for repair coupling. The invention will be better understood after reference to the figures.

FIG. 1 shows a lay barge 1 pulling itself on its anchor winch line 2 and having crew's quarters 3 and derrick 4 along through the water while pipe joints 5a, 5b, and 5c are being welded onto the already welded-up part of the line comprising assembly 6 joints 6a, 6b, 6c, 6d, and 6e along with assembly 7 comprising 7a through 7e and 8a through 8e and assemblies 9 and 10 comprising 9a through 9e and 10a through 10b respectively, according to the numbering scheme thus established. Parts of 7, 8, and 9 are draped through the water, while 6 is supported by pipe rollers 11 and stinger 12. Segments 5a and 5d await welding. The foregoing closely resembles the prior art.

Different from the prior art are the joints of pipe 6a, 7a, 8a, 9a, 10a, and so on down the line already laid, to the right of the Figure. The weld between 8a and 8b is the same as one might find in the prior art. The novel connections occur, in this example, every 200 feet, or every fifth 40' joint as will now be shown in detail.

FIG. 2 shows the joint 8a in greater detail, along with joints 8b and 7e. Joint 8a is typical of all joints lettered a, all of which have special features of the invention. All joints including 7e, 8a, and 8b, are of steel pipe, for example 36 inch diameter by ½ wall, with a reinforced concrete coating 13 all around the pipe over most of the middle of the joint length. Each joint is joined to its neighbors by circumferential welds 14, and each of the welds is coated for weight and for protection by an asphaltic concrete 13a.

Joint 8a and other such joints a, have a novel flange 15 thereon, of central interest here. Flange 15 is shown more clearly in FIGS. 3 and 4 being detailed views of joint 8a in the line. For clarity, FIG. 4 does not show weight coat 13 or coating 13a.

Figure 3:
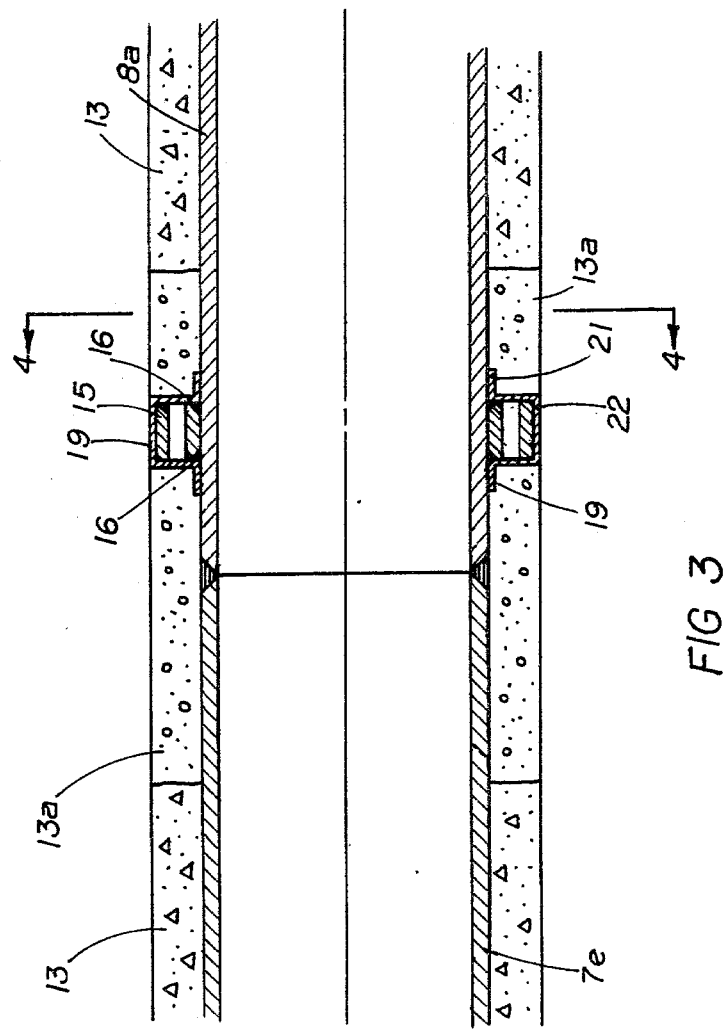
FIG. 3 is a longitudinal cross sectional view of one embodiment of a flange attached to a laid pipeline according to the present invention.

The FIGS. 3 and 4 show the joint 8a with the flange 15 previously welded thereto by welds 16. The flange 15 has holes 17 spaced regularly therearound, after the manner of pipe flanges. The holes 17 are filled with plugs 18. The flange with its plugs 18 and welds 16 is surrounded, covered, and protected by flashing 19. The asphaltic concrete 13a covers the sides 20 and flanges 21 of the flashing 19, but does not cover the outside face 22. The face 22 may be highly reflective for finding.

Figure 5:
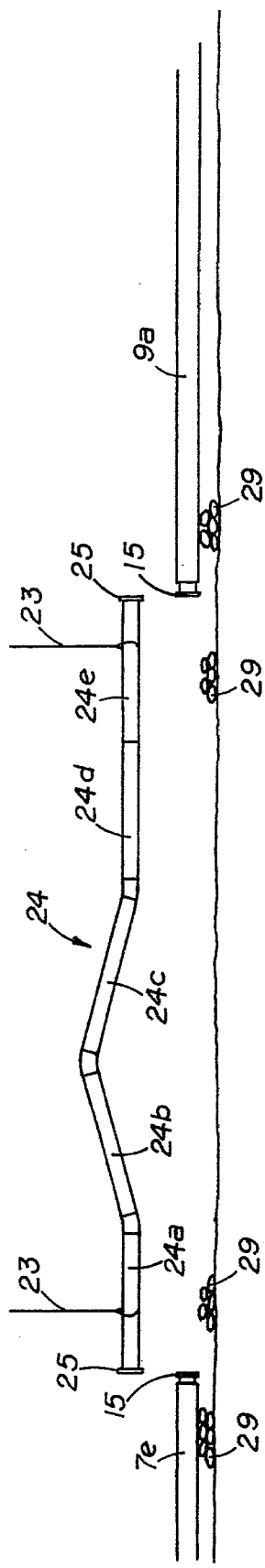
FIG. 5 shows one embodiment of the method of repairing a laid pipe line according to the present invention.
Figure 6:
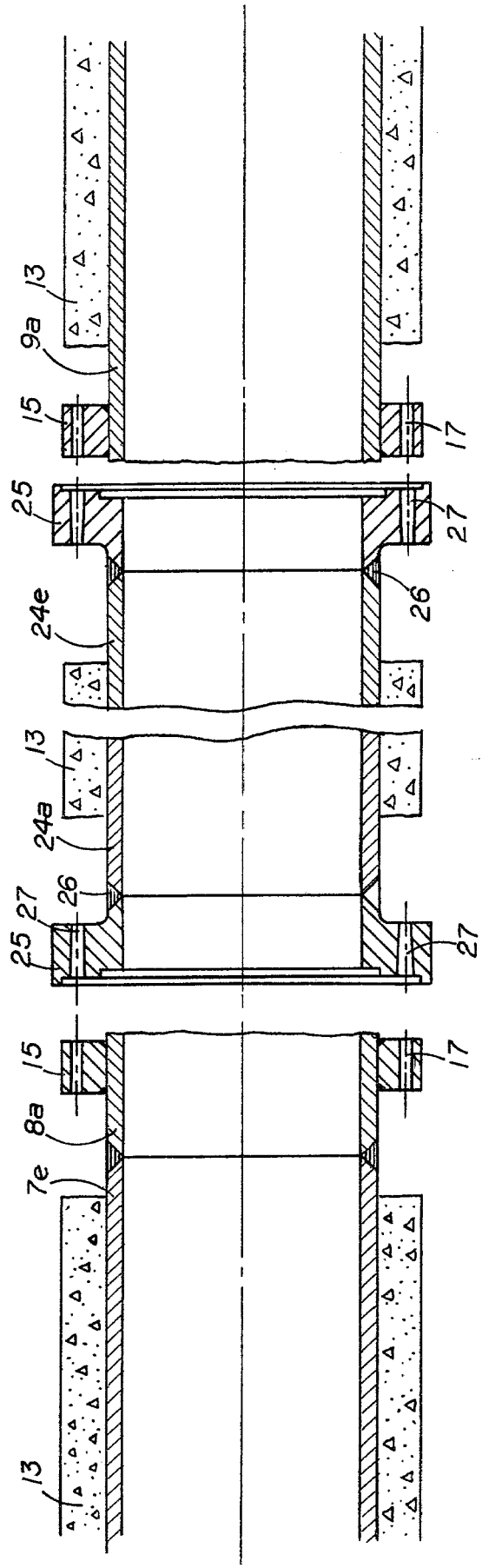
FIG. 6 is a cross sectional detail view of a repair or assembly in progress according to the present invention.

FIGS. 5 and 6 show a repair. FIG. 5 shows a general view of the repair, with FIG. 6 showing the same thing in detail, at a slightly later stage. The situation shown supposes that some part of segment 8 became defective, perhaps it was overstressed during laying, and sprang a leak in segment 8c. The approximately 200 foot length from flange 15 on 8a to flange 15 of 9a is shown to have been removed after discovery of the leak as by an inspecting diver walking the pipeline. In FIG. 5 cables 23 from a surface vessel are lowering a replacement length 24 of pipeline to the gap resulting from said removal of said approximately 200 foot length. Length 24 comprises 5,40' joints 24a, 24b,-24e, in angular assembly comprising also flanges 25. Joints 24a and 24e are coaxial, with their ends less than 200 feet apart by the sum of the thicknesses of two flanges 15 plus one flange 15 plus a tolerance. The segments 24b, and 24c, are angularly disposed to fill the space remaining, and previously welded into place. This disposition introduces axial relating flexibility of the flanges 25 sufficient to allow apparent "stretching" of assembly 24 to take up said tolerance, and sufficient to allow some relative rotary and torsional displacement of flanges 25. The segments 9a and 7e are shown resting on sandbags 29 supported somewhat above the bottom. Other sandbags 29 are placed to support segment 24.

FIG. 6 shows much of the same material in much greater detail and after the assembly 24 has been lowered into the gap resulting from cuts 28. A diver has stripped away coating 13a and flashing 19 from flanges 15 and removed plugs 18 from holes 17. Flanges 25 are approximately aligned with flanges 15 and ready for insertion of high strength bolts through holes 17 and on into and through conoidal holes 27. Holes 27 are conoidal to allow insertion of bolts even in case of some misalignment.

Figure 7:
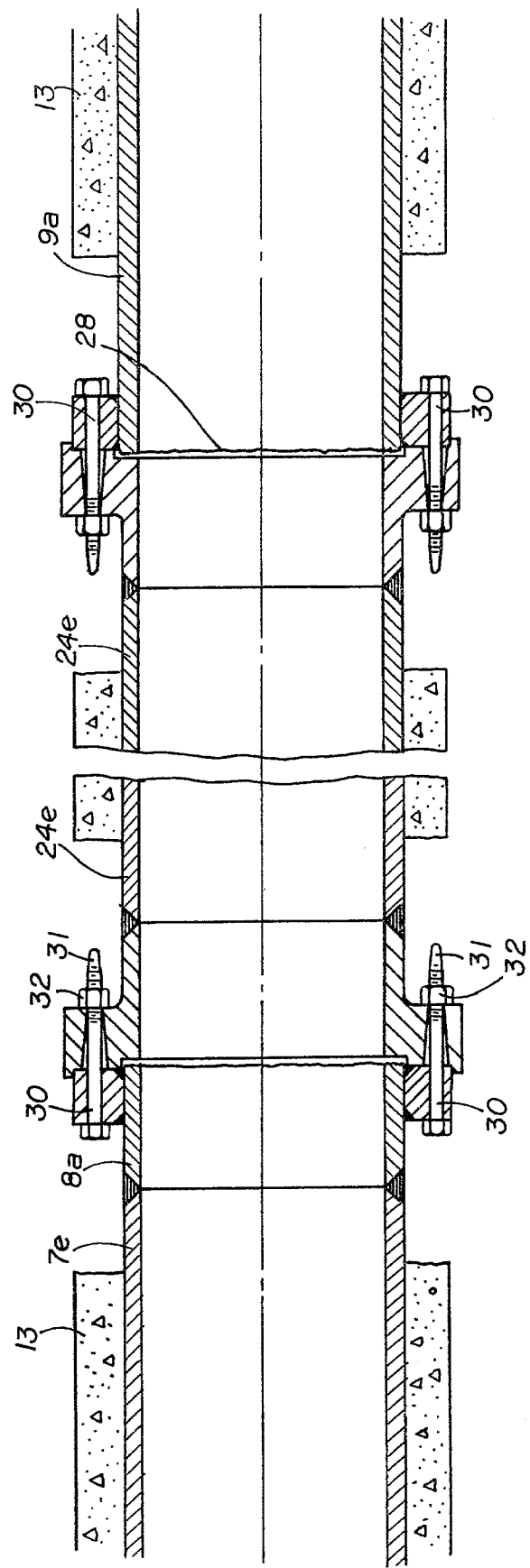
FIG. 7 shows a cross sectional view of a completed assembly according to the present invention.

FIG. 7 shows the completed assembly in detail, with the pipeline repaired and ready for service. Bolts 30 have been inserted into all holes 17 and 27, with insertion aided by conical points 31. Nuts 32 have been actuated cyclically stretching, twisting, and bending flexible assembly 24 sufficiently to take up said tolerance and to seat and to seal flanges 25 against flanges 15. Removal or puncture of sandbags 28 and 29 to lower the whole back to the marine floor is optional, as is placement of new asphaltic concrete around the newly made connections.

In practicing the invention as in the embodiment shown in the FIGS. 1–7, 20 percent of the pipe joints had flanges 15 welded onto them ashore, where they are also weightcoated. Boatloads of such joints are loaded onto the barge 2 and the joints are welded up into a pipeline by the proceedure which will now be apparent to those skilled in the art. Every fifth joint will have been laid with a flange 15. The pipeline is laid and connected at its ends optionally by means 15 as shown, or by other means known in the art, thus practicing the invention for construction.

In practicing the invention for standby, some assemblies 24 are prepared and held ready and waiting along with whatever other equipment is desired to standby, such as perhaps work boats, submarine cranes, and diving equipment.

In practicing the invention for repair, a defect is identified and located, and a vessel carries an assembly 24 to the site, in case the defect is entirely between two adjacent flanges 15, or appropriately longer or similar assemblies in case a longer section is damaged. A diver goes to the bottom, and with appropriate tools and precautions well known in the art, lifts the pipeline onto sandbags 29 and cuts out the damaged length between two flanges 15 with cuts 28. Assembly such as 24 is lowered into the gap thus created and bolts 30 are driven through holes 17 and 27. Nuts 32 act to seat and seal flanges 25 against flanges 15, and the pipeline is optionally set off of the sandbags onto the marine floor.

Practicing the invention for construction as above allows application for standby and for repair as above, bringing considerable benefit as noted. Recalling the benefits mentioned under the discussion of the "Hard Flange" repair method above, all of its benefits are obtained, and none of its restricting difficulties as mentioned. It is only necessary to take the precaution of installing flanges 15 regularly along the pipeline according to the present invention.

Many advantageous details of the above method and apparatus should be noted, including:

(1) The flanges 15, being numerous and precautionary, are small and simple, for low cost.

(2) The flanges 15 are of outer diameter not greater than that of the weight coating 13, so that they will not damage the stinger or hang on fishing nets and anchors.

(3) The holes 17 in the flanges 15 are filled with loose plugs to eliminate flow of the asphaltic concrete 13a into them.

(4) The flashing 19 is protective of the flanges 15 to keep their sealing surfaces ready, and is readily stripped away to expose flanges 15.

(5) The face 22 may be reflective. It may be bright white, or it may be reflective to other than visible light for finding by electronic or sonic means.

(6) The flanges 25 are shaped to accomodate rough cuts 28.

(7) The holes 27 and bolts 30 are shaped to allow ready bolt insertion.

(8) The holes 27 and 17 are more numerous and more closely spaced and smaller than holes in typical flanges so the flanges may be smaller as in 1 and 2 above, and so the diver can handle the bolts more easily, and so the torsional alignment problems will be less, due to the closer spacing. This is made possible by the use of high-strength lightweight bolts.

(9) The assembly 24 is assembled angularly, with the two ends aligned and the angularity antisymmetric about the center making for beneficial end flexibility and allowing great tolerance as said for insertion of assembly 24.

(10) The sandbags 29 are a convenient means for holding the pipe up at working height for the diver but other new onbottom handing equipment described in copending application, Ser. No. 588,761, filed June 20, 1975, by Maurice N. Sumner will make them unnecessary.

All ten of the above are beneficial improvements, but the invention may be practiced without them by other means.

Much variation is possible in the practice of the invention, still bringing the benefits, including:

(1) Other flanges than bolted flanges could be employed, including (a) flanges with no holes, designed to be held together with c-clamps (b) flanges designed to be held with keeper romgs (such as are made by Cameron Iron Works of Houston, Tex. or Gray Tool Co. of Houston, Tex. with appropriate modifications) (c) One-bolt flanges and two-bolt flanges having split keeper rings, (such as are made by Unibolt) and (d) spherically faced flanges allowing angular misalignment, and (e) conically faced flanges for forcing axial alignment.

(2) Instead of single flanges, true ordinary flanged connections with only bolts holding them together could be placed at intervals, eliminating any need for cuts such as 28.

(3) Instead of flanges, other obtrusions, such as threads or studs could be placed in regular array along the pipeline. In case of studs or in other cases, dressing tools for making a machined face in place under water could prepare the pipe ends themselves to be seating surfaces.

(4) Instead of flashing 19, a readily strippable plastic coating could be applied to flanges 15.

(5) Instead of reflective faces 22, transductive elements could serve to locate the flanges, or some of them. Also, radiation sources could be installed.

(6) The flanges could have gasket grooves.

(7) The flanges as at 25 could be articulated, with torsional and angular and axial alignment along machined surfaces.

(8) The assembly such as 24 could be made of hose or flexible pipe (such as Coflexip) or a segment of it could be so made, allowing for gross displacement, such as would result from mud slides.

Figure 9:
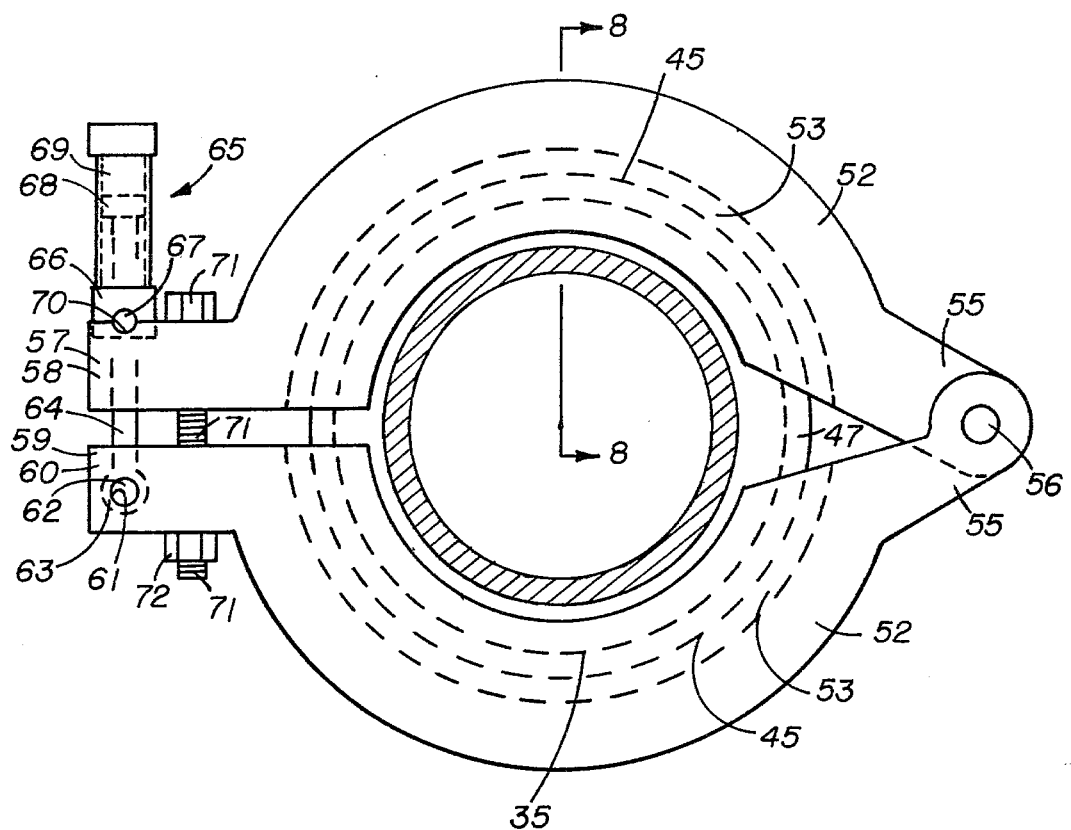
FIG. 9 is a cross section view of a pipe having a clamping device employing a flange according to the present invention shown in FIG. 8.
Figure 8:
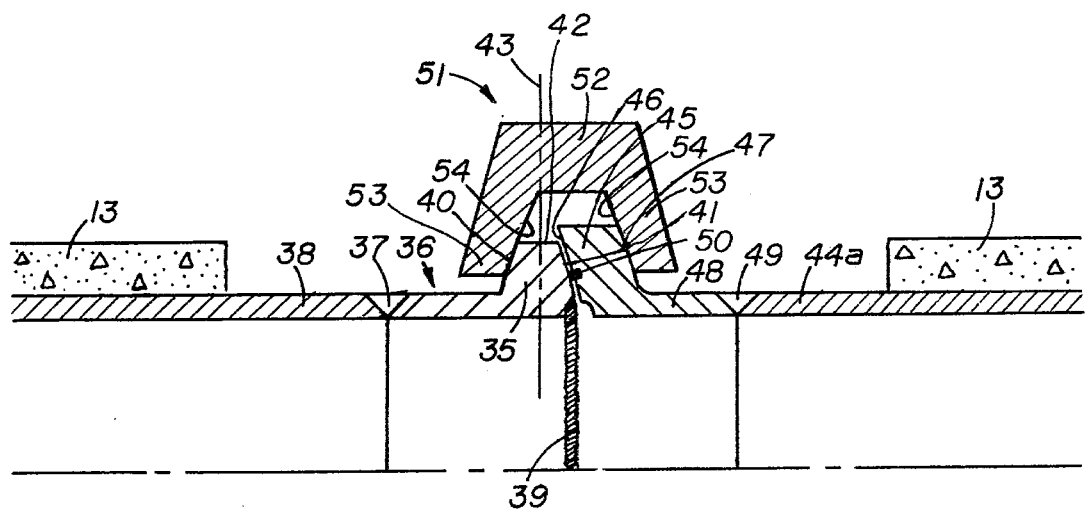
FIG. 8 shows a cross sectional view of one method of making a metal-to-metal seal employing a flange according to the present invention along 8—8 of FIG. 9.

Some desirable variations of the invention will now be illustrated, first in FIGS. 8 and 9, wherein flange 35 is comparable to flange 15, but having lip 36 for weld 37 to joint 38 of the laid pipeline. Flange 35 has cut 39 comparable to cut 28 of FIG. 6; it also has two faces 40 and 41 of spherical curvature, and an outer face 42 of diameter not greater than the outer diameter of weight coat 13. The center line 43 of flange 35 is a centerline of symmetry of manufacture; for example, the faces 40 and 41 are symmetrical thereabout; before the cut 39 is made there is also another lip such as lip 36, and another weld such as 37 so that the flange 35 is then entirely symmetrical about the transverse plane represented by line 43; however, they have now been cut away.

There is also assembly 44, comparable to assembly 24 of earlier Figs. Assembly 44 comprises lengths of pipe (including joint 44a), weight coat 13, flange 45 with spherical faces 46 and 47 and with lip 48 held to joint 44a by weld 49. Flange 45 has sealant ring 50 in face 46. Face 46 and ring 49 are held firmly against face 41 by action of closing ring 51.

Closing ring 51 has web 52 and flanges 53 having spherical faces 54 matching and bearing on faces 40 and 47, all of which have spherical curvature. The center of curvature of faces 46 and 47, are identical. The radius of curvature of 41 and 46 are identical, with the radius of 47 being therefore greater. Ring 51 is shown in cross-section in FIG. 8, and in elevation in FIG. 9, which is a view along the axis of the pipeline.

Closing ring 51 is shown in FIG. 9 to have hinge bearings 55 with pin 56 allowing ring 51 to open and close around flanges 35 and 45. Ring 55 has 4 lugs 57, 58, 59, and 60, with 57 and 59 hiding 58 and 60 in FIG. 9. There is a bore 61 with pin 62 through 59 and 60. Pin 62 holds eye 63 of ram rod 64 of hydraulic ram 65. Ram 65 comprises rod 64 of hydraulic ram 65. Ram 65 comprises rod 64 with eye 63 and trunnion block 66 with pin 67 and piston 68 in cylinder 69. Pin 67 bears on recess 70 of lugs 57 and 58.

Bolt 71 with nut 72 drawing lugs 57 and 58 towards lugs 59 and 60 hold closing ring 51 also, just as does ram 65 in the view.

To practice the invention for construction using the manufactures of FIGS. 8 and 9, the pipeline is laid as before but with a multiplicity of flanges 35 laid at intervals along the line, just as a multiplicity of flanges 15 were laid along the line in FIG. 1, excepting that each of flanges 15 is attached to the outside of a joint, while flanges 35 intervene between two joints, which would be advantageous for stress.

To practice the invention for standby, an assembly 44 of length equal to the distance between adjacent flanges is made up and held ready along with a closing ring 51. Other assemblies of length greater than 44, but otherwise similar could also be made ready for cases where a longer length of line might be expected to need repair, as by replacement of lengths between two non-adjacent flanges 35.

To practice the invention for repair, a vessel with suitable apparatus and assemblies 44 and 51 would proceed to the site of damage. A diver would go over the side, (or, in case of availability, an automaton, automatic machine or submarine) remove the damaged section with cuts 39, lower assembly 44 into the gap created, position 51 around flanges 35 and 45, actuate ram 65 to clamp ring 51 onto flanges 35 and 45, actuate bolt 71 and nut 72 to make the closure secure and permanent, remove ram 65, whereupon a connection would be complete. Completion of the connection at the other end by the same means would make the pipeline serviceable and repaired.

Heretofore only practice for construction, standby, and repair have been mentioned. The invention can also be practiced for modification, as in case of installation of valves or tees in an existing line. If preinstalled flanges such as 15 or 35 are present in a line, new apparatus, such as valves or tees can readily be installed by including valves or tees in the assembly such as 24 or 44, which is another benefit of the invention.

Note the following features and advantages of the invention of FIGS. 8 and 9.

1. Connection would be quick, since it would be accomplished by actuation of a single hydraulic ram and a single bolt.
2. The spherical surfaces allow misalignment of the means 44 with the line.
3. Again, no expensive apparatus is left below.
4. Other advantages mentioned before are still obtained.

Figure 10:
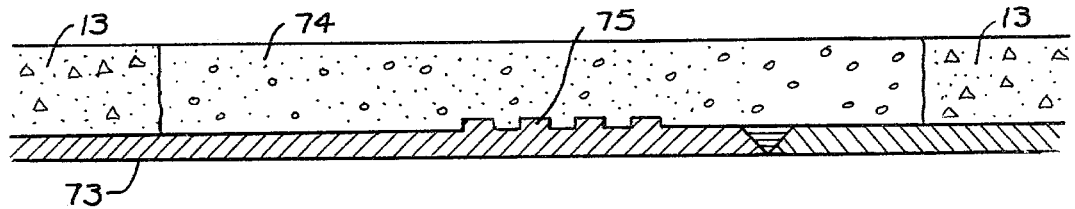
FIG. 10 shows an alternative embodiment in cross section wherein the flange comprise an external thread.

Another embodiment is shown in FIG. 10, wherein there is a pipe 73 with weight coat 13 and with threads 75 forged into the outside of a part of the pipe length. Threads 75 are covered with rubber ring 74 covering all around the circumference of the pipe. To practice the invention for construction using the pipe of FIG. 10, the pipeline is laid with such rubber-covered threaded lengths at intervals, using available methods of the art, which might include rolling the pipe off of a reel, or methods such as those of FIG. 1. In order to avoid weakening the pipe, the threads are preferably protrusions extending beyond the wall of the pipe. That is to say threads could be cut into the pipe, but the pipe would have to have thicker walls at that point or the cutting of the threads would create inherent weaknesses in the pipeline.

To practice the invention for standby, threaded flanges or unions matching the threads of FIG. 10 would be held ready, along with tools of the art and suitable replacement lengths of pipe.

To practice the invention for repair, the pipe 73 would be cut away immediately adjacent to threads 75, on the side toward the damage. A threaded flange or union could then be threaded onto the threads 75, and then the replacement length of pipe coupled thereto.

Similar methods would work for a piece of pipe similarly provided with only internal threads. A cover would need to be placed over the internal threads to avoid interference with flow, and the weight coat would need to be marked with reflective or other material so that the thread could be identified.

Figure 11:
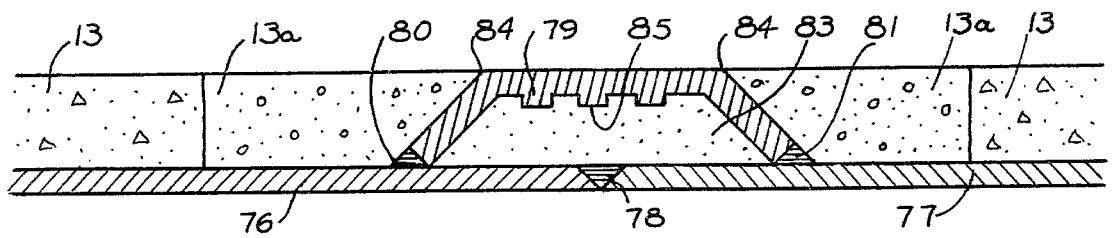
FIG. 11 shows alternative embodiment in cross section wherein the flange comprises a member having internal threads.
Figure 12:
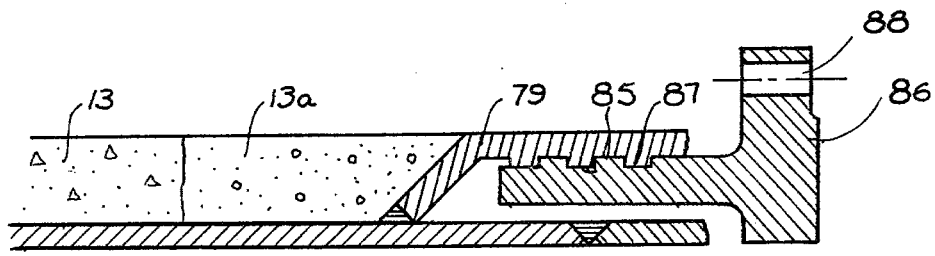
FIG. 12 illustrates the flange embodiment of FIG. 11 used to make a connection to an externally threaded member.

Another embodiment is shown in FIGS. 11 and 12. There is a pipe joint 76 and joint 77, joined together partly by weld 78. There is ring 79 which extends around the circumference of 76 and 77 and is welded thereto by welds 80 and 81 respectively is filled with filler stuffing 83 and has shoulders 84 and internal threads 85. In FIG. 12, ring 79 has been cut at the right shoulder 79, and the pipe 77 has also been cut and flange 86 having threads 87 matching threads 85 has been screwed into said threads 85. Flange 86 has holes 88 for bolts, and a repair can now be made by a variation of the "Hard Flange" method as will now be obvious to one skilled in the art from the teachings herein.

Figure 13:
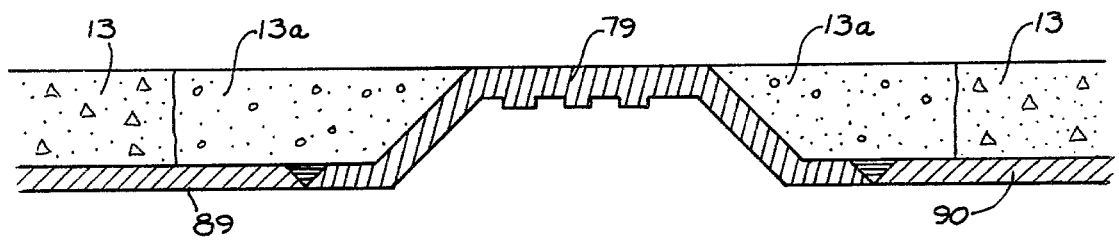
FIG. 13 shows an alternative embodiment in cross section of the internally threaded flange of FIG. 11.

FIG. 13 shows a variation of the matter of FIG. 11 wherein a gap is left between ends of pipe joints 89 and 90, corresponding otherwise to 76 and 77, except that weld such as 78 has been omitted. Welds 91 and 92, corresponding otherwise to 80 and 81, are relied on to supply strength to the construction connection. Otherwise the practice is analagous to that of FIGS. 11 and 12.

Those skilled in the art will see many variations on the practice taught here, but the principles will be the same; this disclosure is sufficient to show the invention. Other bosses than flanges and threads are contemplated; other connector means than hydraulic rams and threads are envisioned, including wedges, breech-lock mechanisms, slips, clamps, ties, cementitious castings and keys. Other than diver work is envisioned, and forgings, castings, weldments, turnings, and other manufactures all may be utilized to obtain the benefits of the invention.

The invention claimed is:

1. A method of repairing continuous submarine pipeline consisting of welded pipe sections comprising;
    locating a continuous submarine pipeline having a plurality of coupling bosses in array therealong,
    cutting said pipeline adjacent to two of said bosses,
    removing said cut portion of pipeline between said two bosses,
    placing a pipe section corresponding to said cut out portion between said two bosses on said pipeline, said pipe section having means thereon adapted to cooperate and engage with said bosses on said pipeline, and
    securing and sealing said pipe section to said two bosses thereby reconstructing said pipeline.

* * * * *